United States Patent [19]

Peters

[11] 4,010,770
[45] Mar. 8, 1977

[54] VELOCITY FLOW CONTROL VALVE FOR FLUID LINE
[75] Inventor: Clifford M. Peters, Longview, Tex.
[73] Assignee: W-K-M Wellhead Systems, Inc., Shreveport, La.
[22] Filed: Mar. 1, 1976
[21] Appl. No.: 662,312
[52] U.S. Cl. .......................... 137/492.5; 137/460; 137/462; 137/517
[51] Int. Cl.² ..................................... F16K 31/12
[58] Field of Search ............. 137/460, 462, 492.5, 137/458, 517, 625.66; 138/46

[56] References Cited
UNITED STATES PATENTS

| | | | |
|---|---|---|---|
| 3,085,589 | 4/1963 | Sands | 137/462 X |
| 3,143,145 | 8/1964 | Kauss | 138/46 X |
| 3,456,442 | 7/1969 | Brooks | 137/517 X |
| 3,746,047 | 7/1973 | Peters | 137/458 X |

*Primary Examiner*—Harold W. Weakley
*Attorney, Agent, or Firm*—Eugene N. Riddle

[57] ABSTRACT

A velocity flow control valve employed in a branch line between a main flow line and pressure responsive pilot valves in a safety system for closing a valve across the main flow line. The flow control valve has interfitting male and female body portions with the male body portion having a spring loaded ball urged upstream to an unseated position and is seated upon a pressure differential to block flow to the pilot valves from the main flow line upon a downstream drop in pressure. A ball bleed valve is positioned on the female body portion upstream of the spring loaded ball and may be opened to reduce fluid pressure between the spring loaded ball and the main flow line when desired.

5 Claims, 4 Drawing Figures

U.S. Patent  Mar. 8, 1977  4,010,770
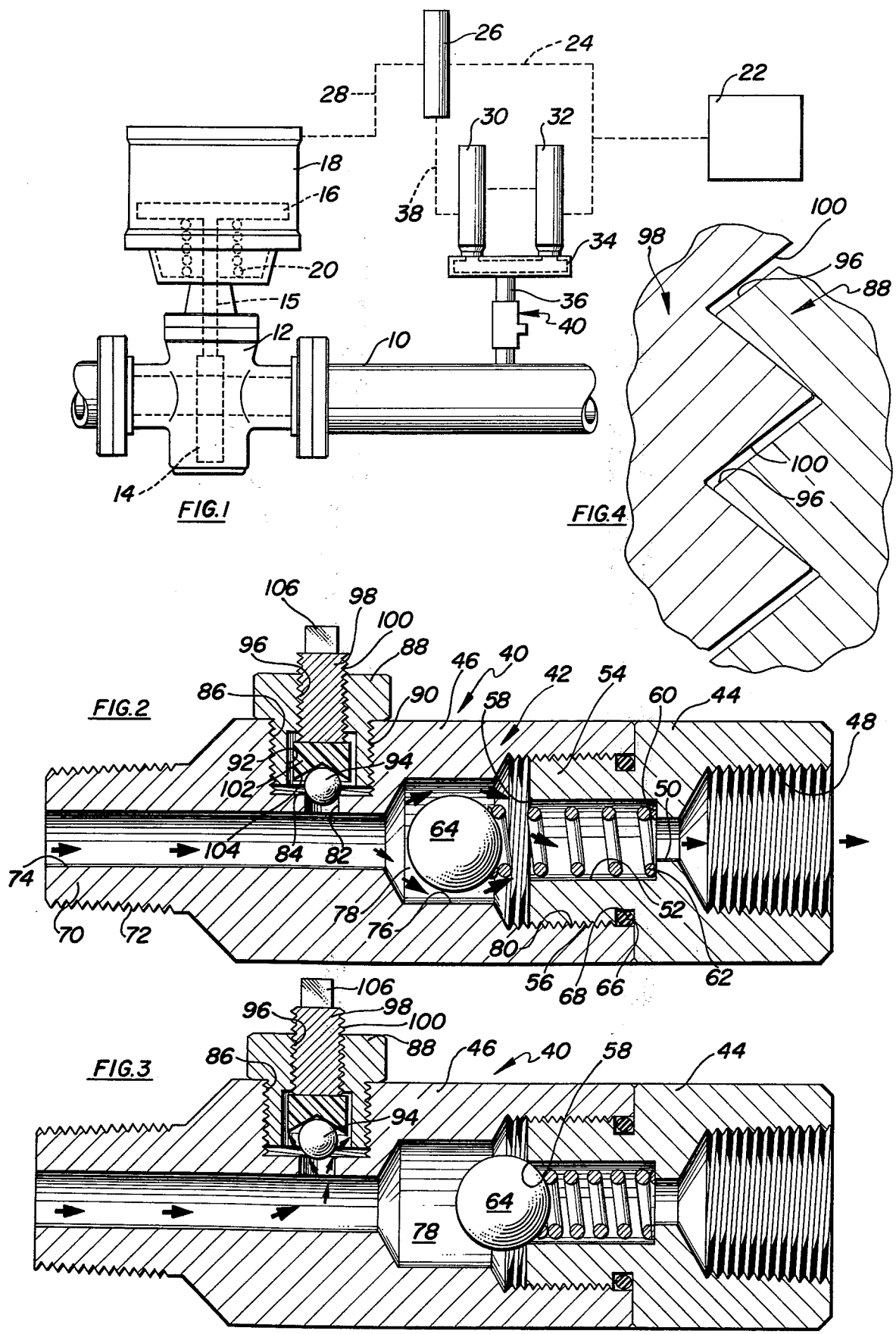

VELOCITY FLOW CONTROL VALVE FOR FLUID LINE

BACKGROUND OF THE INVENTION

Heretofore, a safety system has been provided to move a gate valve to a closed position across a main flow line responsive to a high pressure or low pressure condition in the flow line. A gate valve in such a safety system has employed a fluid actuator with the supply of fluid to the actuator being controlled by pilot valves. Upon actuation of either a low pressure pilot valve or a high pressure pilot valve the actuator would be bled of fluid to permit a gate valve across the main flow line to be moved to closed position. The pilot valves are normally responsive to the fluid pressure in the main flow line and a branch line is provided between the pilot valves and the main flow line to provide a fluid pressure to the pilot valves so that the pilot valves may sense the fluid pressure in the main flow line. Heretofore, in the event a break in the branch line occurred or a substantial leak developed in the line adjacent the pilot valves, the flow line fluid would be released to pollute the area and cause other difficulties. This is particularly a potential problem in the event of a long length branch line between the main flow line and the pilot valves.

BRIEF DESCRIPTION OF THE PRESENT INVENTION

The present invention is directed to a velocity flow control valve for a safety system in which a fluid actuator controlled gate valve in a main flow line is closed upon the reaching of certain predetermined high and low pressures in the main flow line. The velocity flow control valve is positioned in a branch line from the main flow line to pilot valves controlling the fluid actuator and when closed blocks the flow line fluid to the pilot valves at a position closely adjacent the main flow line. The flow control valve has a longitudinally extending main body with two body portions threaded together in end-to-end relation forming an upstream female body portion and a downstream male body portion. The downstream male body portion has a ball valve seat on its inner end about a central bore therein, and a coil spring which fits within the central bore has a ball valve member on its extending end for seating on the ball valve seat to block the flow of fluid through the branch line when the ball valve is urged against the bias of the spring by a predetermined pressure differential. The upstream female body portion has an enlarged inner bore portion forming a valve chamber which receives the ball valve and permits a flow of fluid around the ball valve in unseated position. A bleed valve is carried by the female body portion upstream of the valve chamber and has a bleed port in fluid communication with the main bore. An externally threaded nut is threaded within a recess on the female body portion adjacent the bleed valve and has a bleed valve chamber formed therein. An externally threaded stem is threaded through the nut and has its inner end in contact with a bleed valve ball to hold the ball in seated position on the outlet end of the bleed port when the stem is tightly engaged. The stem threads are loosely engaged with the nut threads to permit a leakage of fluid about the threads when the stem is loosened for unseating of the bleed valve ball.

In the event of a break in the line or a substantial leakage of fluid downstream of the improved flow control valve, the ball valve will be seated by the upstream fluid pressure to block the flow of fluid to the pilot valves. After any repair or the like has been made, the bleed valve may be opened to permit a reduction of pressure in the branch line for unseating of the ball valve to permit the flow of fluid pressure to the pilot valves from the main flow line. The two-piece body construction is provided to permit an inexpensive and simple method of assemblying the body for the flow control valve. Also, the construction of the bleed valve arrangement closely adjacent the ball valve member permits the bleed valve to be easily positioned in the female body portion of the valve body.

DESCRIPTION OF THE DRAWINGS

The invention is illustrated and shown in the accompanying drawing, forming a part of this specification, wherein:

FIG. 1 is schematic of the present invention arranged in a safety system to control the opening and closing of a gate valve in a main flow line;

FIG. 2 is an enlarged longitudinal section of the flow control valve shown in the system of FIG. 1 with the ball valve shown in an open position and the bleed valve shown in a closed position to permit the flow of fluid through the control valve;

FIG. 3 is an longitudinal section similar to FIG. 2 but showing the ball valve in a seated position to block the flow of fluid through the control valve and the bleed valve in an open position to permit the leakage of fluid from the bleed port about the threaded connection of the stem; and FIG. 4 is an enlarged fragment of FIG. 3 showing the loosely fitted stem engaging the screw threads in the adjacent nut to permit the leakage of fluid when the stem is in a loosened condition.

Referring now to the drawing for better understanding of this invention, and more particularly to FIG. 1, the flow control valve of the present invention is illustrated in a safety system for closing a valve and a main flow line or conduit is shown at 10 having a main flow passage therein for a primary fluid pressure source. A gate valve shown at 12 has a gate valve member 14 therein positioned for movement between open and closed positions relative to the main flow line 10. A stem 15 has its lower end connected to gate valve member 14 and its upper end connected to piston 16 mounted within a cylinder 18. A spring 20 continuously urges piston 16 toward a closed position of gate valve member 14. A reservoir 22 supplies fluid through line 24, by-pass valve 26, and line 28 to cylinder 18 to move piston 16 to the open position of gate valve member 14 as shown. A low pressure pilot valve 30 and a high pressure pilot valve 32 are mounted on a base or manifold 34. A branch line 36 connects flow line 10 with manifold 34 so that flow line pressure is transmitted from flow line or conduit 10 through branch line 36 to manifold 34 which is in fluid communication with low pressure pilot 30 and high pressure pilot valve 32. Low pressure and high pressure pilot valves 30 and 32 are in a normally open position and in this position fluid is supplied for reservoir 22 to cylinder 18 to maintain piston 16 in the down position as shown in FIG. 1. Low pressure pilot valve 30 and high pressure pilot valve 32 are maintained in open position in a fluid pressure operating range which may be predetermined. Upon the reaching of a predetermined low pressure, low pressure pilot 30 will move to a closed position to exhaust fluid to atmosphere from line 38 to permit gate valve member 14 to move to a closed position under bias of spring 20. Likewise, when a predetermined high fluid pressure is reached in conduit 10, high pressure pilot 32 moves to a closed position to exhaust the fluid to atmosphere likewise resulting in the movement of gate valve member 14 to a closed position. For further details of the operation of pilot valves 30 and 32, reference is made to U.S. Pat. No. 3,034,331, the entire disclosure which is incorporated by this reference.

Branch line 36 may under certain conditions be of a relatively long length, such as ten (10) or twenty (20) feet depending on the particular operating conditions. Especially when a long length branch line 36 is provided, it is possible that breaks or other damage might occur in branch line 36 and a possible leakage of flow line fluid might result in this event. To block the flow of fluid from main flow line 10 to pilot valves 30 and 32 and thereby minimize leakage from branch line 36 in the event of damage, the velocity flow control valve comprising the present invention and generally indicated at 40 is positioned in branch line 36. Flow control valve 40 has a main body indicated generally at 42 which includes a male body portion 44 and a female body portion 46. Male body portion 44 has a central bore including an outer section 48 with internal screw threads, an intermediate section 50 of a reduced diameter, and an inner section 52. A reduced diameter inner end section 54 of male body portion 44 is externally threaded at 56. A valve seat 58 is formed on reduced diameter end 56 about the periphery of inner bore section 52. An annular ledge or seat 60 is provided at the juncture of intermediate bore section 50 with inner bore section 52 and provides a seat for a coil spring 62 mounted within inner bore section 52. A ball valve 64 is secured to the extending end of spring 62 and is adapted to seat on seat 58. Reduced diameter end 54 has a groove 66 receiving an O-ring 68 for sealing between body portions 44 and 46.

Female body portion 46 has a reduced diameter outer end 70 having external screw threads 72 thereon. A central bore in female body portion 46 includes an outer section 74, an intermediate section 76 forming a valve chamber 78, and an end section 80 having internal screw threads which engage external screw threads 56 on end portion 54 of male body portion 44. Valve chamber 78 receives ball valve 64 and the extending end of spring 62.

A bleed port 82 has an inlet end communicating with bore section 74 and an outlet end forming a seat 84. An enlarged recess 86 in female body portion 46 is internally threaded and a nut 88 having an externally threaded reduced diameter end 90 is threaded within recess 86. Nut 88 has an opening 92 in its inner end forming a valve chamber which is in communication with and adjacent bleed port 82. A bleed valve ball 94 is seated on seat 84 to block any flow of fluid from bleed port 82. To hold bleed ball 94 in a seated position on seat 84 for blocking flow of fluid from bleed port 82, nut 88 has a threaded bore 96 therein and a stem 98 having external screw threads 100 is threaded within threaded bore 96. The inner end of stem 98 has a resilient force exerting member 102 with a notched groove 104 forming a pocket to receive ball 94 as shown in FIGS. 2 and 3. A fitting 106 on the extending end of stem 98 may be engaged by a wrench or the like for tightly engaging bleed ball 94 and holding bleed ball 94 in seated position on seat 84. As noted in FIG. 4, screw threads 96 on nut 88 and screw threads 100 on stem 98 are loosely engaged and upon loosening of stem 98, fluid under pressure may flow between screw threads 96 and 100 to provide fluid leakage from chamber 92 and bleed port 82. As an example, the clearance or spacing between threads 96 and 100 may be .003 inch.

In operation, referring to FIG. 2, velocity flow control valve 40 is shown in its normal operating condition in which fluid pressure from main flow line 10 is transmitted to manifold 34 with spring 62 urging valve ball 64 away from seat 58 so that fluid bypasses ball valve 64. In this position, bleed ball 94 is tightly seated on seat 84 and prevents any leakage of fluid from bleed port 82. In the event of a break in line 36 or a leak in manifold 34, the pressure downstream of ball valve 64 would be reduced and upstream pressure would move ball valve 64 into seated position on seat 58 as shown in FIG. 3. As an example, a pressure differential of around seven (7) or eight (8) psi between upstream and downstream sides of ball valve 64 is adequate to seat ball valve 64 against the bias of spring 62 to block the flow of fluid. After a break or other malfunction has been repaired, it is desirable to reduce the pressure in valve chamber 78 for unseating of ball valve 64 and to accomplish this, stem 98 is loosened to permit bleed ball 94 to be unseated and fluid to leak between threads 96 and 100. After a sufficient reduction of fluid pressure in chamber 78, spring 62 unseats ball valve 64 and flow line pressure is again communicated to manifold 34 for low pressure pilot valve 30 and high pressure pilot valve 32.

What is claimed is:

1. In a safety system for closing a gate valve in a main flow line having a fluid actuator for closing the gate valve, a pilot valve to control the flow of fluid to the actuator, and a branch line between the main flow line and the pilot valve to supply fluid pressure from the main flow line to the pilot valve, the improvement comprising a velocity flow control valve in the branch line adjacent the main flow line, said flow control valve having a longitudinal extending main body including two body portions threaded together in end-to-end relation to form an upstream female body portion and a downstream male body portion both having a central bore therethrough forming a flow passage, said downstream male body portion having a ball valve seat on its inner end about the central bore and a coil spring within the central bore and extending beyond the valve seat, a ball valve member on the extending end of the spring adapted to seat on the ball valve seat and block the flow of fluid therethrough when urged against the bias of the spring by a predetermined pressure differential, said upstream female body portion having an enlarged inner end forming a valve chamber for receiving the ball valve and permitting a flow of fluid around the ball valve when in an unseated position, said female body portion having a bleed port in fluid communication with the bore upstream of the valve chamber, and a bleed valve closing said bleed port in one position and permitting in another position the bleeding of fluid from the bore.

2. In a safety system as set forth in claim 1 wherein said female body portion has a threaded recess adjacent the bleed valve and the bleed valve comprises a ball seated on the outlet end of said bleed port to block the flow of fluid from the bleed port, and an externally threaded nut is threaded within said recess and has a valve chamber adjacent its inner end to receive the ball, said nut having a central internally threaded opening therein and an externally threaded stem threaded within said opening and having an inner end in contact with the ball to hold the ball in a seated position when tightly engaged, said stem being loosely engaged with the internally threaded nut to permit fluid leakage when the stem is loosened to unseat the ball.

3. In a safety system as set forth in claim 2 wherein the inner end of said stem has a resilient member thereon having a pocket to receive the ball therein and to contact the ball for urging the ball into tight seated position on the bleed port.

4. A velocity flow control valve in a fluid flow line comprising, a longitudinal extending main body including two body portions threaded together in end-to-end relation to form an upstream female body portion and a downstream male body portion both having a central bore therethrough forming a flow passage, said downstream male body portion having a ball valve seat on its inner end about the central bore and a coil spring within the central bore and extending beyond the valve seat, a ball valve member on the extending end of the spring adapted to seat on the ball valve seat and block the flow of fluid therethrough when urged against the bias of the spring by a predetermined pressure differential, said upstream female body portion having an enlarged inner end forming a valve chamber for receiving the ball valve member and permitting a flow of fluid around the ball valve member when in an unseated position, said female body portion having a bleed port in fluid communication with the main bore upstream of the valve chamber and an enlarged internally threaded recess adjacent the bleed port, an externally threaded nut threaded within said recess and having an opening in its inner end forming a valve chamber, a bleed ball valve seated on the bleed port to close the bleed port, said nut having a central internally threaded opening therein and an externally threaded stem threaded within said opening and having an inner end in contact with the bleed ball valve to hold the bleed ball valve in a seated position when tightly engaged, said stem being loosely engaged with the internally threaded nut to permit fluid leakage between the nut and stem when the stem is loosened to unseat the bleed ball valve.

5. A velocity flow control valve as set forth in claim 4 wherein the inner end of said stem has a resilient member thereon having a pocket to receive the bleed ball valve therein and to contact the bleed ball valve for urging the bleed ball valve into tight seated position on the bleed port.

* * * * *